Aug. 8, 1950 F. HOLKENBRINK 2,517,667
DEVICE FOR MEASURING TAPER
Filed Nov. 8, 1945
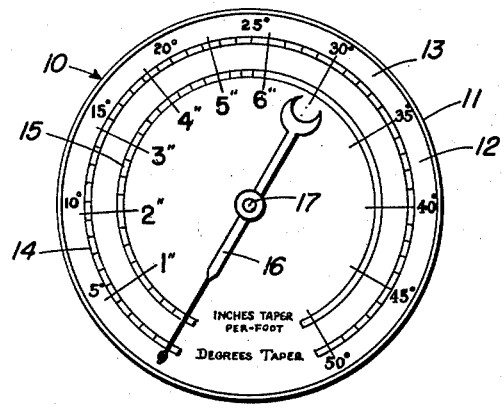
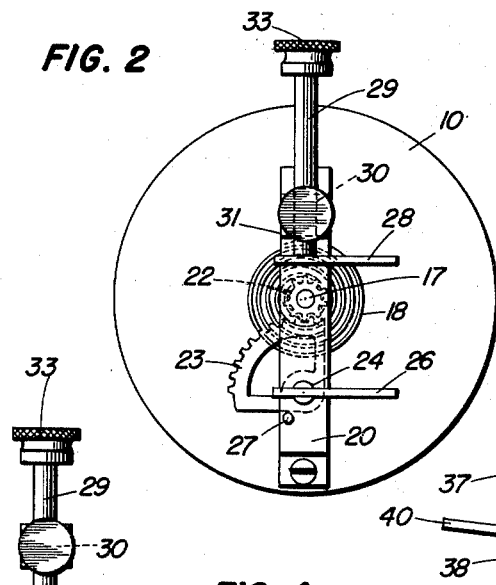
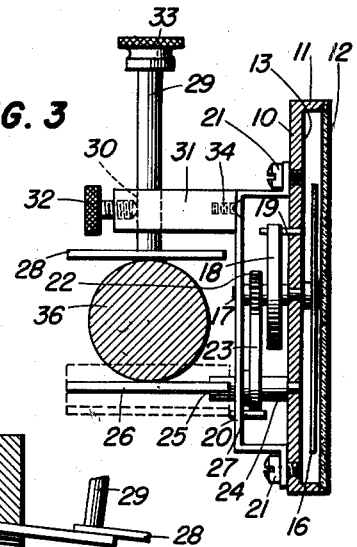
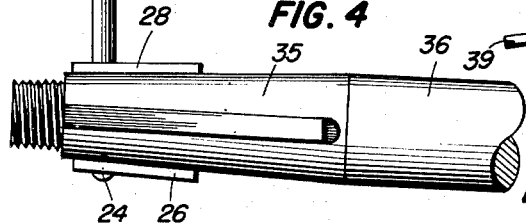
Inventor
FRANK HOLKENBRINK
By *Clarence A. O'Brien and Harvey B. Jacobson*
Attorneys Patented Aug. 8, 1950

2,517,667

UNITED STATES PATENT OFFICE 2,517,667

DEVICE FOR MEASURING TAPER

Frank Holkenbrink, Sigel, Ill.

Application November 8, 1945, Serial No. 627,354

3 Claims. (Cl. 33—75)

This invention relates to a device for measuring taper, that is, a device or tool for measuring the angle of taper, such as the outside taper on axles or similar objects, and also the inside taper of bores and hubs of gears, wheels and the like.

It is an object of the invention to provide a simple and novel device for measuring tapers having a calibrated dial on which the results can be read quickly and directly by means of an indicator movable over the calibrated dial and adapted to be operated by connection with a pivoted or swinging vane through multiplying gears to magnify the resulting movement of the indicator pointer which may have a fixed relation of known character, with relation to the movement of the pivoted or swinging vane which engages the tapered part or bore to be measured.

Another object of the invention is to so construct the device and arrange the vanes that the device may be readily engaged with internal or external surfaces to facilitate the measuring of the taper of a bore or the outside angle of taper of an axle spindle or the like.

A still further object of the invention is to provide a device or gauge for measuring the angle of taper both inside and outside with respect to bores, hubs of gears, wheels and the like, or the outside angle of taper of axles, such as the spindles thereof or similar objects.

Other objects and advantages reside in the details of construction and operation as more fully hereinafter described and claimed, reference being had to the accompanying drawings forming part hereof, wherein like numerals refer to like parts throughout, and in which:

Figure 1 is a front elevation of a device or gauge for measuring the angle of taper of internal bores or externally of objects, constructed in accordance with the invention and looking at the calibrated dial thereof.

Figure 2 is a rear elevation of the device showing the actuating mechanism for the indicator pointer.

Figure 3 is a diametrical sectional elevation thereof showing the device in use for measuring an external taper.

Figure 4 is a fragmentary rear elevation with parts including the casing and actuating mechanism omitted, and showing the device for measuring external taper as of an axle spindle, and Figure 5 is a fragmentary sectional elevation showing the device as constructed for measuring externally or internally.

Referring to the drawings in detail, the device, tool or gauge is shown as comprising a circular indicator casing 10 having a lateral flange at its periphery or perimeter as indicated at 11 so that it is closed at the back and open at the front, to be covered by a transparent window 12 seated and retained in the flange 11 at its open side. The front of the casing 10 at the inside forms a dial 13 which is calibrated as at 14, to indicate degrees of taper, and a concentric annular calibration 15, indicating inches in taper per foot. While the measurement of taper by the circular calibrations in inches is shown concentric to and within the circular arrangement of calibrations indicating degrees of taper, this arrangement may be reversed if desired.

A pointer 16 is mounted to move over and relative to the dial and calibrations thereof, and is secured to a shaft 17 at the axial center through the back of the casing 10, and is held in its zero position by a helical or hair spring 18 having one end connected to the shaft and the other or outer end anchored to the back of the casing 10 as indicated at 19 to serve as a balancing means. The shaft 17 extends rearwardly to form the staff of the indicator, and also has bearing in an elongated U-shaped bracket, frame or other bearing 20 at the back of the casing 10 and shown demountably secured thereto as by means of the screws 21 threaded into the back of the casing and through openings in the legs of the bracket.

Fixed to the shaft or spindle 17 is a pointer drive pinion 22, which meshes with a sector gear 23 fixed to a staff or stud shaft 24 also rotatably supported in the back of the casing 10 and in the bracket 20 below the shaft 17. The inner end of the shaft 24 projects beyond the bracket 20 and may be slotted or otherwise provided as at 25 to support a swinging vane 26 shown in the form of a flat plate diametrically of shaft 24, near one end thereof so that the opposite end extends radially a considerably greater distance than the anchored end to be coextensive or in line with the tapered surface to be measured in the general direction of the axis thereof. A stop 27 may be provided to limit the movement of the sector gear 23 in the zero position of the pointer 16 on the dial 13. Cooperating with the pivoted or swinging vane 26 is a similar vane 28 which is carried by the lower end of a post 29 extending vertically through a bore 30 in a supporting block 31 and adapted to be held in vertically adjusted position by a set screw 32 threaded into a threaded bore at the free end of the block or support 31 and engaging the periphery of the post 29. This post or stem may be provided with a knurled head 33 by which it may be raised or lowered or otherwise manipulated. As shown, the vane 28 while normally horizontally, may be turned by reason of the supporting member or block 31 being mounted on the bearing bracket 20 in a horizontal position as by means of a screw or the like 34 so that it may be turned or adjusted at any desired angle to cooperate with the vane 26 should this be desired. The vane or plate 28 is preferably non-swivelled and can be moved toward or away from the vane 26 for different sizes of work to be measured. In Figures 3 and 4, it is shown in use for measuring the outside taper such as the tapered end of spindle 35 of an axle 36, or similar object so as to determine the outside angle of taper thereof. Thus, in use, when the device is applied, and the vane 26 is swung at an angle upon fitting the tapered surface, it will actuate the sector gear 23 and by reason of the meshing engagement of the latter with the pinion 22 cause the pointer 16 to be turned over the dial to indicate on the calibrations 14, the degrees of taper or on the calibrations 15, the taper in inches per foot. Since the movement of the pointer is magnified or multiplied, by reason of the gear drive arrangement as described and may be at a given or known ratio, the result can be read directly upon the graduations of the dial calibrated in degrees or inches and fractions thereof or otherwise as desired. Since the pointer or indicator 16 is connected to the swinging actuating vane 26 through multiplying gears, the result will be magnified and indicated directly on the calibrated dials. Thus, a very compact small tool or device is provided for measuring the taper of such objects as axles, drive shafts, lathe centers and the like with direct readings in inches per foot or degrees. It is a precision tool or gauge which can be made and sold at the price of a good micrometer. Also, adjustment may be provided by means of the stem or post 29 upon adjusting the same, to accommodate the objects of different diameters and taper, by simply loosening the set screw 32 and then tightening the same when the flat or plain surfaces of the vanes 26 and 28 properly fit and conform to the tapered external surface of the object. This is done by merely pushing the object between the vanes while holding the device in one hand, and since the parts are very light, including the bracket or frame 20, greater facility is had in its use.

In Figure 5 of the drawings the device is shown for measuring the internal bore such as of a flywheel or gear or the like indicated at 37. The vanes or flat plates 26 and 28 may be directly fitted in the tapered bore 38 or by means of rectilinear extensions 39 and 40 thereof with the post or stem 29 extending perpendicularly to the plane of the vane or plate 40 or turned as previously described. However, the ordinary position is to secure the supporting member or block rigidly and to impart angular movement to the vane or plate 26 which, in turn, actuates the pointer of the indicator so as to swing the same over the dial and register the exact angle of taper of the bore on the calibrations 14 and 15, as previously explained. The extensions 39 and 40 may be straight bars inserted and held in the bore, to which the vanes 26 and 28 are applied externally, instead of relying upon the radial extensions of the vanes 26 and 28 to fit the bore directly. Thus, the device may be quickly applied and used to measure outside tapers of axles, drive shafts or other tapered objects to be measured, the vane 26 readily accommodating itself to match the taper of the object externally or internally, the latter whether applied to the external surfaces of two straight bars fitted in the bore or hole to give the inside degree or angle of taper thereof, or fitted directly in said bore or hole.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed is:

1. A device for measuring the angle of taper of outside tapers or inside tapers and bores, comprising a casing having a dial with calibrations thereon arranged in concentric rows, a pointer rotatably mounted in the casing to swing over the calibrations, a frame secured to the casing, a vane pivoted in the frame and casing and having multiplying geared connections with the pivot of the pointer, a second vane carried by the frame and adjustable toward and away from the first vane, said vanes being disposed facewise toward each other to engage opposite outside and inside portions of a tapered member and a bore respectively, and means for returning said pointer to zero position, said means including a spring-tensioned shaft journaled in said casing and mounting said pointer.

2. A device for measuring the angle of taper of outside tapers or inside tapers and bores, comprising a casing having a dial with calibrations thereon arranged in a circle, a pointer rotatably mounted in the casing to swing over the calibrations, a frame secured to the casing, a vane pivoted in the frame and casing and having multiplying geared connection with the pivot of the pointer, a supporting member on the frame, a post adjustable in the supporting member and having a vane thereon, adjustable with the post toward and away from the pivoted vane said vanes being flat members opposing each other flatwise, means to hold the post in adjusted position to accommodate objects of different diameters or bores of different diameters to and in which the vanes are fitted, the first vane adapted to swing and through the geared connection, to actuate the pointer, said vanes adapted to be fitted against diametrically opposite portions of the periphery of a tapered object, against bars or extensions within an internal bore or to directly fit in said bore to measure the angle of taper thereof, and means for returning the pointer to zero position, said means including a spring-tensioned shaft journaled in said casing and mounting said pointer.

3. A device for measuring the angle of taper of outside tapers or inside tapers and bores, comprising a casing having a dial with calibrations thereon arranged in concentric rows to indicate taper in degrees and in inches per foot, a pointer rotatably mounted in the casing to swing over the calibrations, a frame secured to the casing, a flat vane pivoted in the frame and casing and having multiplying geared drive connection with the pivot of the pointer, a supporting member on the frame, a post adjustable in the supporting member toward and away from the pivoted vane and having a flat vane thereon spaced from the pivoted vane, said vanes opposing each other flatwise, means to hold the post in adjusted position to accommodate objects of different diameters or bores of different diameters to and in which the vanes are fitted, the first vane adapted to swing and through the geared connection, to actuate the pointer, means for turning the post and second vane, means for limiting the movement of the pointer to zero position in connection with the gear drive, and means for returning said pointer to zero position, said means including a spring-tensioned shaft journaled in said casing and mounting said pointer.

FRANK HOLKENBRINK.

REFERENCES CITED

The following references are of record in the file of this patent:

UNITED STATES PATENTS

| Number | Name | Date |
|---|---|---|
| 70,547 | Graham | Nov. 5, 1867 |
| 94,814 | Fales | Sept. 14, 1869 |
| 105,121 | Otsot | July 5, 1870 |
| 482,888 | Fox | Sept. 20, 1892 |
| 602,524 | Rockey | Apr. 19, 1898 |
| 716,170 | Barnes | Dec. 16, 1902 |
| 777,606 | Creamer | Dec. 13, 1904 |
| 1,254,218 | Eskelinen | Jan. 22, 1918 |
| 1,427,510 | Avery | Aug. 29, 1922 |
| 2,000,926 | Cox | May 14, 1935 |
| 2,413,841 | Minuto | Jan. 7, 1947 |

FOREIGN PATENTS

| Number | Country | Date |
|---|---|---|
| 359,535 | Germany | Sept. 23, 1922 |